(12) United States Patent
Wingett et al.

(10) Patent No.: US 7,111,522 B2
(45) Date of Patent: Sep. 26, 2006

(54) ENERGY STORAGE FLYWHEEL SYSTEM CONTAINMENT VESSEL

(75) Inventors: Paul T. Wingett, Mesa, AZ (US); Sharon K. Brault, Chandler, AZ (US); George J. Klupar, Phoenix, AZ (US); Calvin C. Potter, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 147 days.

(21) Appl. No.: 10/788,745

(22) Filed: Feb. 26, 2004

(65) Prior Publication Data

US 2005/0188777 A1    Sep. 1, 2005

(51) Int. Cl.
G01C 19/06 (2006.01)
F16P 1/00 (2006.01)
H02K 7/02 (2006.01)
H02K 5/00 (2006.01)

(52) U.S. Cl. .................. 74/5.7; 74/609; 74/572.11; 310/89

(58) Field of Classification Search .................. 74/5.7, 74/608, 609, 572; 428/66.6; 310/51, 85, 310/89; 415/9, 196, 121.2–3
See application file for complete search history.

(56) References Cited

U.S. PATENT DOCUMENTS

| | | | | |
|---|---|---|---|---|
| 3,602,602 A | * | 8/1971 | Motta | ............................ 415/9 |
| 4,603,555 A | | 8/1986 | Mayer | |
| 5,239,221 A | * | 8/1993 | Juan | ............................ 310/258 |
| 5,387,451 A | | 2/1995 | Miller | |
| 6,182,531 B1 | | 2/2001 | Gallagher et al. | |
| 6,203,924 B1 | | 3/2001 | Smith | |
| 6,356,005 B1 | * | 3/2002 | Hsu | ............................ 310/254 |
| 6,756,091 B1 | * | 6/2004 | Smith | ............................ 74/609 |
| 6,943,471 B1 | * | 9/2005 | Toyokawa et al. | ............ 310/90 |
| 2004/0025625 A1 | * | 2/2004 | Griswold et al. | ............. 74/574 |
| 2005/0025615 A1 | * | 2/2005 | Gabrys et al. | ................. 415/9 |

OTHER PUBLICATIONS

NASA P&PO: Aerospace Flywheel Development: Spin Test Facility [online]. Nasa Glenn Research Center. Retrieved from Internet: <URL:www//space-power.qrc.nasa.gov/ppo/projects/flywheel/stf.html>.

NASA P&PO: Aerospace Flywheel Development: Accomplishments [online]. Nasa Glenn Research Center. Retrieved from Internet: <URL:www//space-power.qrc.nasa.gov/ppo/projects/flywheel/accomp.html>.

Test Devices Inc.: Spin Testing [online]. Eric Sonnichsen of Test Devices, Inc. Retrieved from Internet: <URL:www.testdevices.com/spintest.htm.

Spin Pits: Barbour Stockwell, Inc. [online] Barbour Stockwell Links, Retrieved from Internet: URL:wwwbarbourstockwell.com/pits.html>.

(Continued)

Primary Examiner—Roger Pang
(74) Attorney, Agent, or Firm—Ingrassia Fisher & Lorenz

(57) ABSTRACT

A containment vessel used to enclose an energy storage flywheel system during certification testing of the energy storage flywheel system includes a plurality of concentrically disposed vessels. One or more intermediate shields are freely disposed within an outer shield, and an inner shield is freely disposed within the intermediate shields. The inner shield includes a deflector rim disposed proximate one of its ends that is configured to absorb the energy of ejected material, in the highly unlikely event of a flywheel failure during testing.

28 Claims, 6 Drawing Sheets

OTHER PUBLICATIONS

J. Kesseli, S. Sullivan, M. Swarden, S.F. Duffy, E.H. Baker, M. Ferber, J. Jounkouski.Advancements in the IR PowerWorks Employing a Ceramic Turbine Rotor, IGTI Microturbine Session, Jun. 16, 2003.

M. Bowler, Flywheel Energy Systems: Current Status And Future Prospects, Magnetic Material Producers Association Joint Users Conference, Sep. 22-23, 1997, p. 1 and p. 7, Trinity Flywheel Power, San Francisco, California.

* cited by examiner

ENERGY STORAGE FLYWHEEL SYSTEM CONTAINMENT VESSEL

FIELD OF THE INVENTION

The present invention relates to energy storage flywheel systems and, more particularly, to a containment vessel used to house an energy storage flywheel system during energy storage flywheel system tests.

BACKGROUND OF THE INVENTION

Many satellites and other spacecraft, as well as some terrestrial stationary and vehicle applications, such as sea-going vessels, can include one or more energy storage flywheel systems to provide both a backup power source and to provide attitude control for the vehicle. In such vehicle applications, each energy storage flywheel system is controlled and regulated to balance the electrical demand in the vehicle electrical distribution system, and may also be controlled in response to programmed or remote attitude (or torque) commands received by a main controller in the vehicle.

In many instances an energy storage flywheel system includes one or more components that are rotationally mounted within a housing. These components, which may be referred to as the rotating group, include, for example, an energy storage flywheel, a motor/generator, and a shaft. The energy storage flywheel and motor/generator may be mounted on the shaft, which may in turn be rotationally mounted in the housing via one or more bearing assemblies. In many instances, the shaft is rotationally mounted using one or more primary bearing assemblies, and one or more secondary, or back-up, bearing assemblies. For example, in many satellite and spacecraft applications, the flywheel system may include one or more magnetic bearing assemblies that function as the primary bearing assemblies, and one or more mechanical bearing assemblies that function as the secondary bearing assemblies.

The rotating group in an energy storage flywheel system may rotate at several thousand revolutions per minute (rpm) during operation. For example, in some applications, the rotating group may reach rotational speeds of up to 100,000 rpm. As a result, the rotating group may experience relatively high centrifugal stresses during rotation. These relatively high centrifugal stresses may, in some highly unlikely instances, cause the rotating group to suffer a structural failure while rotating at high rotational speed. This in turn may result in high-speed fragments being thrown from the rotating group. These high-speed fragments could present a hazard to surrounding systems and components, as well as to persons that may be in the vicinity. In addition, if such an unlikely failure were to occur while testing a flywheel rotor that is constructed of a composite material, such as filament wound carbon fiber, individual fibers can be thrown from the flywheel. These fibers can have sufficient energy to ignite and generate plasma.

Thus, before placing an energy storage flywheel system into service, the system, or at least the rotating group, undergo certification testing at full speed to ensure the rotating group can withstand the centrifugal forces at full speed. When an energy storage flywheel system, or at least the rotating group, is being certification tested, the components under test may be placed in a containment vessel. The containment vessel is preferably designed to contain any high-speed fragments that could potentially result from an unlikely structural failure of the rotating group while rotating at full speed.

Although presently known containment vessels are generally safe and reliable, these known vessels do suffer certain drawbacks. For example, many vessels are susceptible to undesirable vibration during flywheel system testing, and/or are not designed to fully contain all the high-speed fragments and/or plasma that may be generated during a highly unlikely failure during testing.

Hence, there is a need for a containment vessel that improves on one or more of the above-noted drawbacks. Namely, a containment vessel that is configured to damp undesirable vibration during flywheel system testing, and/or to fully contain all the high-speed fragments and/or plasma that may be generated during a highly unlikely failure during testing. The present invention addresses one or more of these needs.

SUMMARY OF THE INVENTION

The present invention provides an energy storage flywheel system containment vessel that is configured to damp undesirable vibration during flywheel system testing, and to fully contain any high-speed fragments and/or plasma that may be generated during a highly unlikely failure during testing.

In one embodiment, and by way of example only, an energy storage flywheel system containment vessel includes an outer vessel, one or more intermediate vessels, and an inner vessel. The outer vessel has a mount end, an insertion end, and an inner surface defining a cavity therein. The intermediate vessel is freely disposed within the outer vessel cavity, and has a mount end, an insertion end, and an inner surface defining a cavity therein. The inner vessel is freely disposed within the intermediate vessel cavity, and has a mount end, an insertion end, and an inner surface defining a cavity therein. The inner vessel cavity has a first end, and a second end that is substantially collocated with the inner vessel insertion end. The inner vessel cavity first end has a first diameter and the inner vessel cavity second end has a second diameter that is less than the first diameter.

Other independent features and advantages of the preferred energy storage flywheel system containment vessel will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description of an exemplary preferred embodiment of an energy storage flywheel containment vessel, for completeness a brief description of an exemplary energy storage flywheel system, which may be inserted into the exemplary containment vessel, will first be described.

Figure 1:
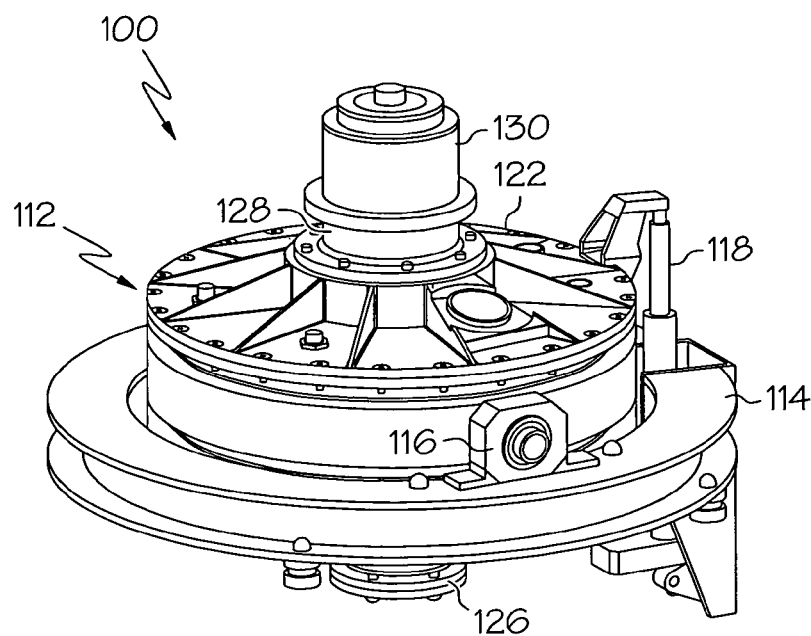
FIG. 1 is a perspective view of a physical embodiment of an exemplary energy storage flywheel system.
Figure 2:
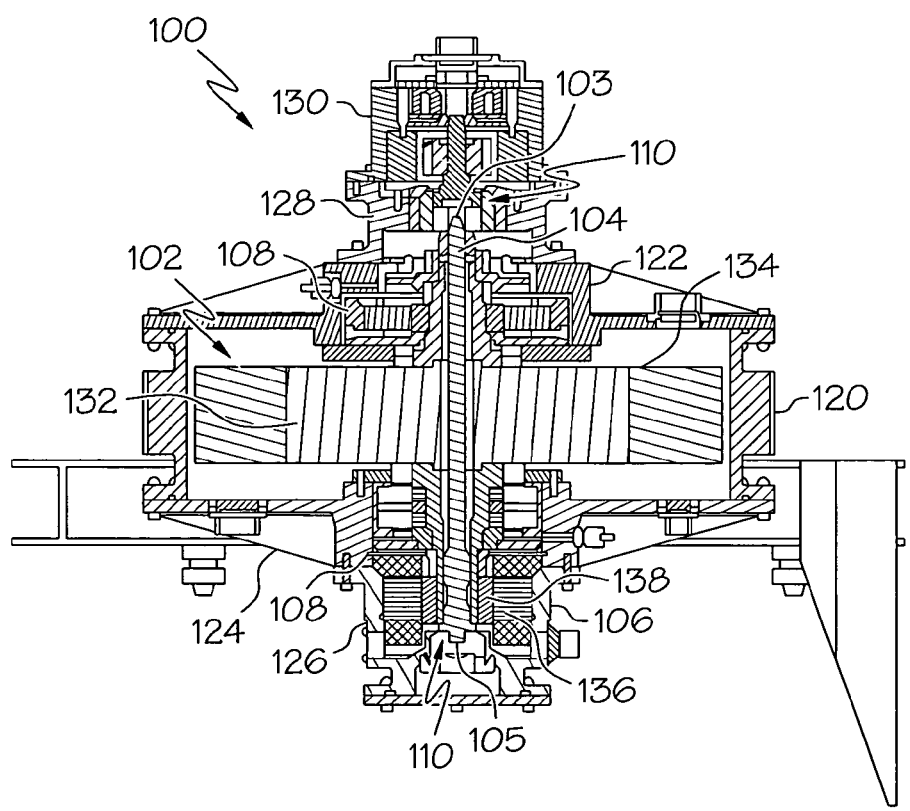
FIG. 2 is a cross section view of the energy storage flywheel system of FIG. 1.

With reference to FIGS. 1 and 2, an exemplary physical embodiment of an energy storage flywheel system 100 is shown. The depicted energy storage flywheel system 100 includes a flywheel assembly 102, a shaft assembly 104, a motor/generator 106, a plurality of primary bearing assemblies 108, and a plurality of auxiliary bearing assemblies 110, all of which are mounted within a housing assembly 112. It will be appreciated that the internal portion of the housing assembly 112, during operation of the system 100, may be placed at a vacuum to minimize aerodynamic losses. It will additionally be appreciated that if the energy storage flywheel system 100 is installed in a natural vacuum environment, such as in space applications, then the housing assembly 112 need not be at a vacuum.

As shown most clearly in FIG. 1, the housing assembly 112, when used, for example, as part of a satellite power and attitude control system is preferably rotationally mounted in a gimbal frame 114 via two gimbal bearings 116 (only one shown). A single gimbal actuator 118 is mounted on the gimbal frame 114 and is adapted to receive control signals from a gimbal controller (not shown). In response to these control signals, the gimbal actuator 118 positions the housing assembly 112 at appropriate angular velocities, to thereby effectuate attitude control. The gimbal actuator 118 may be any one of numerous types of actuators such as, for example, a linear actuator, as shown in FIG. 1, or a rotary actuator.

In the depicted embodiment, the housing assembly 112 includes a central section 120, two end sections 122 and 124, a motor/generator housing 126, an auxiliary bearing housing 128, and an auxiliary motor housing 130. Although the housing assembly 112 is depicted as being constructed of numerous sections that are coupled together, it will be appreciated that it could be formed as an integral structure. In any event, the motor/generator housing 126 is coupled to the housing assembly second end section 124, the auxiliary bearing housing 128 is coupled to the housing assembly first end section 122, and the auxiliary motor housing 130 is coupled to the auxiliary bearing housing 128.

The components mounted within the housing assembly 112 will now be described, beginning first with the flywheel assembly 102. The flywheel assembly 102 may be constructed in any one of numerous configurations and of any one of numerous materials. In the depicted embodiment, the flywheel 102 includes a hub 132 and a flywheel rim 134. The hub 132 is mounted on the shaft assembly 104. The hub 132 may be constructed in any one of numerous configurations including, for example, a solid configuration, a spoke-type configuration, or a combination thereof, and may be constructed of any one of numerous known suitable materials. The flywheel rim 134 is mounted on, and surrounds, the hub 132, and is preferably constructed of a material having a high strength-to-density ratio such as, for example, filament wound carbon fiber.

The shaft assembly 104, as was alluded to above, is coupled to the flywheel assembly hub 132, and is additionally coupled to portions of the motor/generator 106. The shaft assembly 104 is rotationally supported in the housing assembly 112, both radially and axially, by either the primary bearing assemblies 108 or the auxiliary bearing assemblies 110. The shaft assembly 104 includes two end sections, a first end section 103 and a second end section 105. The shaft assembly first 103 and second 105 end sections are at least partially surrounded by one of the secondary bearing assemblies 110. The shaft assembly 104 and auxiliary bearing assemblies 110 are configured such that the shaft assembly first 103 and second 105 end sections do not contact the auxiliary bearing assemblies 110, unless the primary bearing assemblies 108 are unable to rotationally supporting the shaft assembly 104.

The motor/generator 106, as was noted above, is at least partially coupled to the shaft assembly 104. In particular, the motor/generator 106 includes a stator assembly 136, which is coupled to the motor/generator housing 126, and a rotor assembly 138, which is coupled to the shaft assembly 104. The motor/generator 106, as is generally known, is configured to operate in either a motor mode or a generate mode. When operating in the motor mode, electrical energy is supplied to the motor/generator stator assembly 136 and, via normal motor action, the supplied electrical energy is converted to mechanical energy in the motor/generator rotor assembly 138, which in turn rotates the shaft assembly 104 and thus the flywheel assembly 102. Conversely, when it is operating in the generate mode, mechanical energy stored in the flywheel assembly 102 is supplied to the shaft assembly 104, which is in turn supplied to the motor/generator rotor assembly 138. This mechanical energy is converted to electrical energy in the motor/generator stator assembly 136, via normal generator action, and is supplied external to the energy storage flywheel system 100. It is to be appreciated that the motor/generator stator 136 and rotor 138 assemblies may be any one of numerous stator and rotor assembly designs known in the art for performing their intended functions. An understanding of the structure of the motor/generator stator 136 and rotor 138 assemblies is not necessary to an understanding of the present invention and, therefore, will not be further described.

In the depicted embodiment, the primary bearing assemblies 108 are magnetic bearing assemblies and the auxiliary bearing assemblies 110 are mechanical bearing assemblies 110. Thus, when the primary bearing assemblies 108 are activated and operating properly, the shaft assembly 104 is rotationally supported by the primary bearing assemblies 108. In this configuration, as was noted above, the shaft assembly first 103 and second 105 ends do not contact the auxiliary bearing assemblies 110. Conversely, when the primary bearing assemblies 108 are deactivated, or otherwise inoperable, the shaft assembly first 103 and second 105 ends do contact the auxiliary bearing assemblies 110, and the shaft assembly 104 is thus rotationally supported by the auxiliary bearing assemblies 110.

It was previously noted that the primary bearing assemblies 108 are preferably magnetic bearing assemblies and that the auxiliary bearing assemblies 110 are preferably mechanical bearing assemblies. More particularly, in the depicted embodiment, the primary magnetic bearing assemblies 108 are active magnetic bearing assemblies, and the auxiliary bearing assemblies 110 are mechanical, ball bearing type assemblies, and one each are positioned on either side of the flywheel assembly 102. In particular, with respect to the view depicted in FIG. 2, one primary bearing assembly 108 and one auxiliary bearing assembly 110 are each positioned above the flywheel assembly 102, and a second primary bearing assembly 108 and a second auxiliary bearing assembly 110 are each positioned below the flywheel assembly 102. It will be appreciated that the number of primary 108 and auxiliary 110 bearing assemblies may be varied and that two of each is merely exemplary of a particular preferred embodiment. It will additionally be appreciated that, although the depicted auxiliary bearing assemblies 110 are single bearing assemblies, one or both of the auxiliary bearing assemblies 110 could be duplex bearing assemblies.

Figure 3:
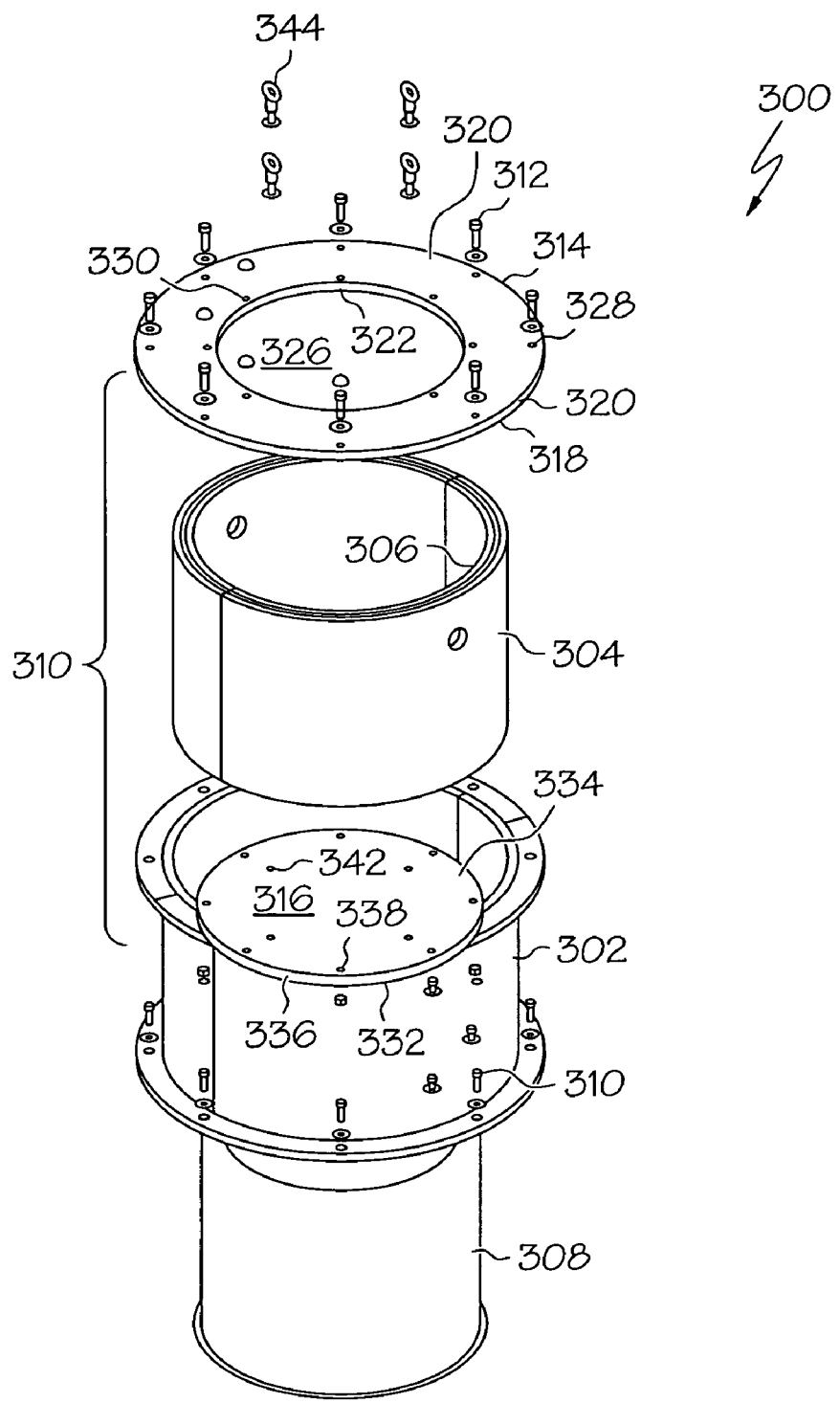
FIG. 3 is an exploded perspective view of an exemplary embodiment of an energy storage flywheel system containment vessel.
Figure 4:
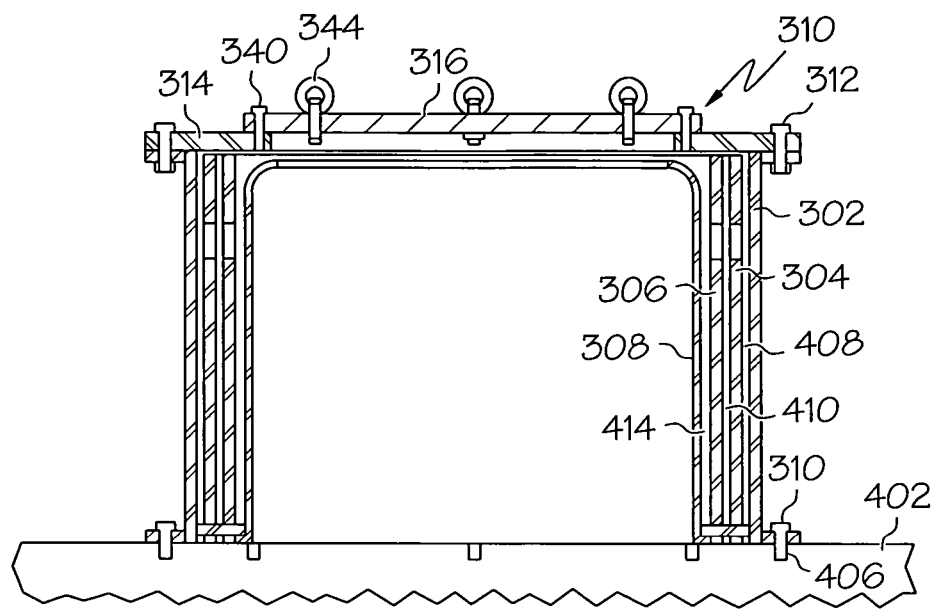
FIG. 4 is a cross section view of the containment vessel shown in FIG. 3, in a fully assembled state.

Turning now to FIGS. 3–11, a description of an exemplary embodiment of a containment vessel used during certification testing of, for example, the above-described energy storage flywheel system 100, will now be provided. Referring first to FIGS. 3 and 4, it is seen that the containment vessel 300 includes a plurality of concentrically disposed shields, and a lid assembly. In the depicted embodiment, the containment vessel 300 includes four concentric shields, an outer shield 302, two intermediate shields 304, 306 and an inner shield 308. It will be appreciated that four shields is merely exemplary of a particular preferred embodiment and that the containment vessel 300 could be constructed of three shields, or more than four shields. It will additionally be appreciated that, although each of the shields 302–308 is preferably generally cylindrical in shaped, one or more of the shields 302–308 could be formed into other shapes.

Figure 5:
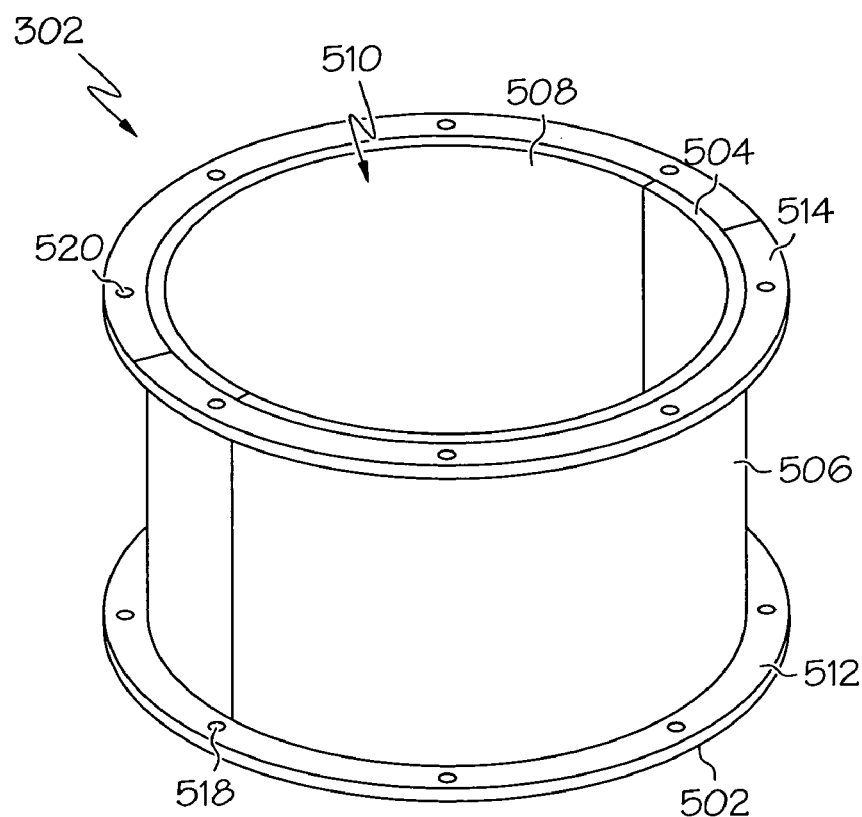
FIG. 5 is a perspective view of an exemplary outer shield that forms part of the containment vessel shown in FIGS. 3 and 4.
Figure 6:
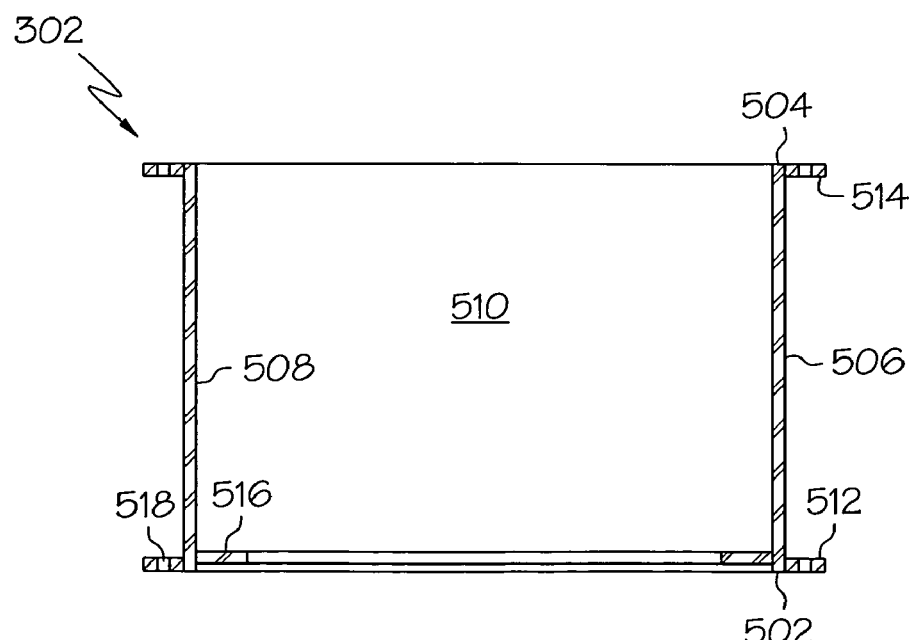
FIG. 6 is a cross section view of the exemplary outer shield shown in FIG. 5.

The outer shield 302, as shown most clearly in FIGS. 5 and 6, includes a mount end 502, an insertion end 504, an outer surface 506, and an inner surface 508 that defines a cavity 510 between the two ends 502, 504. The outer shield additionally includes two flanges, a vessel mount flange 512, and a lid mount flange 514, and an inner support ring 516. The mount end 502 opens into the cavity 510 and, as shown in FIG. 4, is preferably configured to contact a mount surface 402, such as a test facility floor. The mount end 502 is open to facilitate feeding various power and test cables, and other conduits, to the energy storage flywheel system (not shown) being tested, as well as to facilitate assembly of the containment vessel 300, which will be described more fully below. It will be appreciated, however, that this configuration is merely exemplary of a preferred embodiment, and the mount end 502 could also be closed. Similar to the mount end 502, the outer shield insertion end 504 opens into the cavity 510. The insertion end 504 is open to also facilitate assembly of the containment vessel 300, and to facilitate insertion of an energy storage flywheel into the containment vessel 300.

The vessel mount flange 512 extends substantially perpendicularly from the outer shield outer surface 506, and is disposed proximate the mount end 502. The vessel mount flange 512 is configured to couple the outer shield 302 to the mount surface 402 (see FIG. 4). Thus, in the depicted embodiment, a plurality of preferably evenly spaced apart fastener openings 518 extends through the vessel mount flange 512. A fastener 310 (see FIG. 3) extends through each fastener opening 518 and is threaded into a threaded opening 406 in the mount surface 402 (see FIG. 4). Although threaded fasteners are depicted as being used, it will be appreciated that other types of fasteners, or other types of fastening mechanisms, could also be used.

The lid mount flange 514 also extends substantially perpendicularly from the outer surface 506, but is disposed proximate the insertion end 504. The lid mount flange 514 is configured to couple the lid assembly 310 to the outer shield 302. Thus, similar to the vessel mount flange 512, a plurality of preferably evenly spaced apart fastener openings 520 extends through the lid mount flange 514. The vessel mount flange fastener openings 520 are preferably threaded and, as will be described further below, receive a threaded lid fastener 312 that is used to couple the lid assembly 310 to the outer shield 302. Although threaded fasteners 312 are depicted as being used, it will be appreciated that other types of fasteners, or other types of fastening mechanisms, could also be used.

The inner support ring 516 is preferably freely disposed in the outer shield cavity 510. The inner support ring 516, as is shown most clearly in FIG. 4, is configured, upon assembly of the containment vessel 300, to support the intermediate shields 304, 306, and to extend over a portion of the inner shield 308. Thus, the inner support ring 516 anchors down the inner shield 308 via the weight of the intermediate shields 304, 306.

Returning once again to FIGS. 3 and 4, it is seen that the lid assembly 310 includes a containment vessel lid 314, and an access plate 316. The containment vessel lid 314 includes an inner side 318, an outer side 320, an outer peripheral surface 322 between the inner 318 and outer 320 sides, and an inner peripheral surface 324 between the inner 318 and outer 320 sides. The inner peripheral surface 324 defines an access opening 326 through the containment vessel lid 314 between the inner 318 and outer 320 sides. The access opening 326, which is closed using the access plate 316, provides limited access to the inside of the containment vessel 300 when the containment vessel lid 314 is in place and the access plate 316 is removed. The containment vessel lid 314 additionally includes a plurality of preferably evenly spaced apart vessel fastener openings 328, and a plurality of preferably evenly spaced apart access plate fastener openings 330, that extend between the inner 318 and outer 320 sides. The vessel fastener openings 328 are each collocated with one of the fastener openings 520 in the lid mount flange 514. As was alluded to above, each of the threaded lid fasteners 312 extends through one of the containment vessel lid fastener openings 318 and into one of the threaded lid mount flange openings 520, to couple the containment vessel lid 314 to the outer shield 302. In the depicted embodiment, the containment vessel lid 314 is substantially ring-shaped, and has an outer diameter that substantially matches that of the lid mount flange 514. It will be appreciated that the depicted shape and size are merely preferable, and that other shapes and sizes could be used.

The access plate 316 includes an inner side 332, an outer side 334, an outer peripheral surface 336, and a plurality of containment lid fastener openings 338 that extend between the access plate inner 332 and outer 334 sides. The containment lid fastener openings 338 are each collocated with one of the access plate fastener openings 330 in the containment vessel lid 314. An access plate fastener 340 extends through each of the containment lid fastener openings 338 and into an access plate fastener opening 330 to couple the access plate 316 to the containment vessel lid 314. The access plate 314 additionally includes a plurality of preferably evenly spaced apart rigging fastener openings 342 that are each configured to accept a rigging fastener 344, which may be used to install and remove the access plate 316. Although threaded fasteners are depicted as being used for both the lid fasteners 312 and the access plate fasteners 340, it will be appreciated that other types of fasteners, or other types of fastening mechanisms, could also be used.

The two intermediate shields, which are referred to herein as the outer and inner intermediate shields 304 and 306, respectively, are disposed concentric to one another, and are each concentrically disposed within the outer shield cavity 510. In particular, the outer intermediate shield 304 is concentrically disposed within, and spaced apart from, the outer shield 302, and the inner intermediate shield 306 is concentrically disposed within, and spaced apart from, the outer intermediate shield 304. Thus, as shown in FIG. 4, a first space 408 is formed between the outer shield 302 and the outer intermediate shield 304, and a second space 410 is formed between the outer intermediate shield 304 and the inner intermediate shield 306. In a particular preferred embodiment, sand or other vibration damping material may be placed in the first 408 and second 410 spaces to damp vibrations that may occur during flywheel testing.

Figure 7:
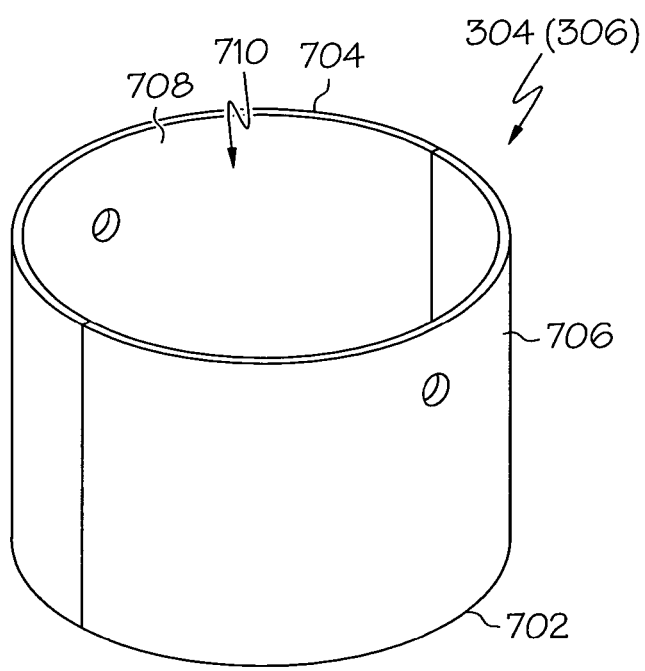
FIG. 7 is a perspective view of an exemplary intermediate vessel that forms part of the containment vessel shown in FIGS. 3 and 4.

With reference now to FIG. 7, which is a perspective view of a single intermediate shield that is representative of both the outer 304 and inner 306 intermediate shields, it is seen that each intermediate shield 304, 306 includes a mount end 702, an insertion end 704, an outer surface 706, and an inner surface 708 that defines a cavity 710 between the two ends 702, 704. The intermediate shield mount end 702 opens into the intermediate shield cavity 710. Similar to the outer shield mount end 502, the intermediate shield mount ends 702 are open to facilitate feeding various power and test cables, and other conduits, to the energy storage flywheel system (not shown) being tested, as well as to facilitate assembly of the containment vessel 300. It will be appreciated, however, that this configuration is merely exemplary of a preferred embodiment, and the mount ends 702 could also be closed. Each of the intermediate shield insertion ends 504 also open into the cavity 510, to also facilitate assembly of the containment vessel 300, and insertion of an energy storage flywheel into the containment vessel 300. In the depicted embodiment, the intermediate shields 304, 306 additionally include a pair of side openings 712 that each extend between the inner 706 and outer 708 surfaces. These openings 712 may be used to rig the intermediate shields 304, 306 in and out of the outer shield 302 during assembly and disassembly of the containment vessel 300. Preferably, the side openings 712 in the outer intermediate shield 304 are offset from the side openings 712 in the inner intermediate shield 306 to reduce the likelihood of fragments traveling through these openings. In a particular preferred embodiment, the side openings 712 are offset by about 90-degrees.

Returning once again to FIG. 4, it is seen that in the depicted embodiment the intermediate shields 304, 306 are supported on the outer shield inner support ring 516. More specifically, the intermediate shield mount ends 702 each contact the inner support ring 516. Moreover, in a particular preferred embodiment, the intermediate shields 304, 306 are freely disposed within the outer shield 302. That is, the intermediate shields 304, 306 are preferably not welded, bolted, or otherwise coupled to the outer shield 302. It will be appreciated that this is merely exemplary of a particular preferred embodiment and that one or both of the intermediate shields 304, 306 could be coupled, in any one of numerous ways, to the outer shield 302. It will additionally be appreciated that the containment vessel 300 could be implemented with more or less than two intermediate vessels.

The inner shield 308 is concentrically disposed within, and spaced apart from, the inner intermediate shield 306. Thus, as FIG. 4 shows, a third space 414 is formed between the inner intermediate shield 306 and the inner shield 308. Similar to the first 410 and second 412 spaces, the third space 414 is also preferably filled with sand to dampen vibration and to provide an additional containment layer. The inner shield 308, as shown more clearly in FIGS. 8 and 9, includes a mount end 802, an insertion end 804, an outer surface 806, and an inner surface 808 that defines a cavity 810 between the two ends 802, 804. The inner shield mount end 802 opens into the inner shield cavity 810, for the same reasons as the other shields 302–306. It will be appreciated, however, that this configuration is merely exemplary of a preferred embodiment, and that the mount end 802 could also be closed. The inner shield insertion end 804 also opens into the cavity 810, to also facilitate assembly of the containment vessel 300, and insertion of an energy storage flywheel into the containment vessel 300.

Figure 8:
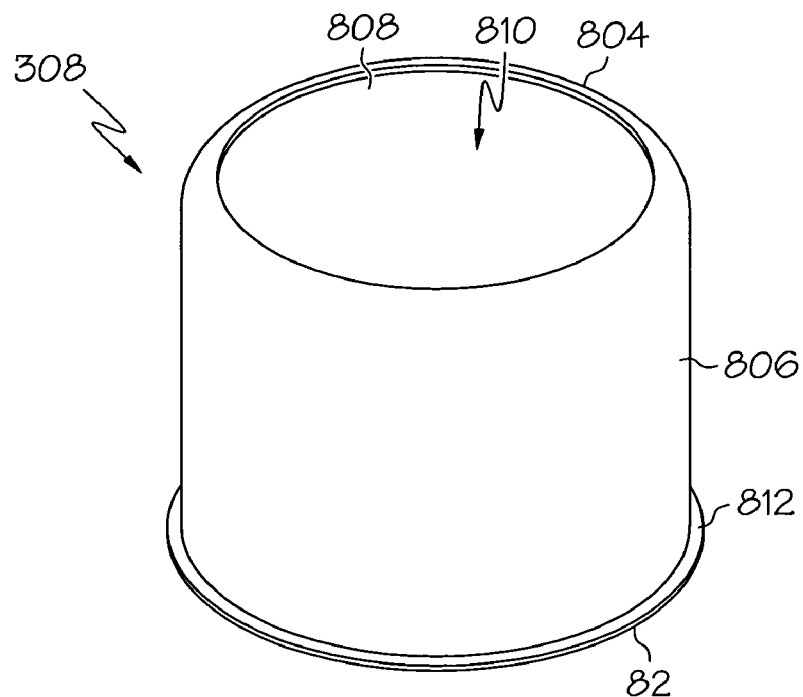
FIG. 8 is a perspective view of an exemplary inner shield that forms part of the containment vessel shown in FIGS. 3 and 4.
Figure 9:
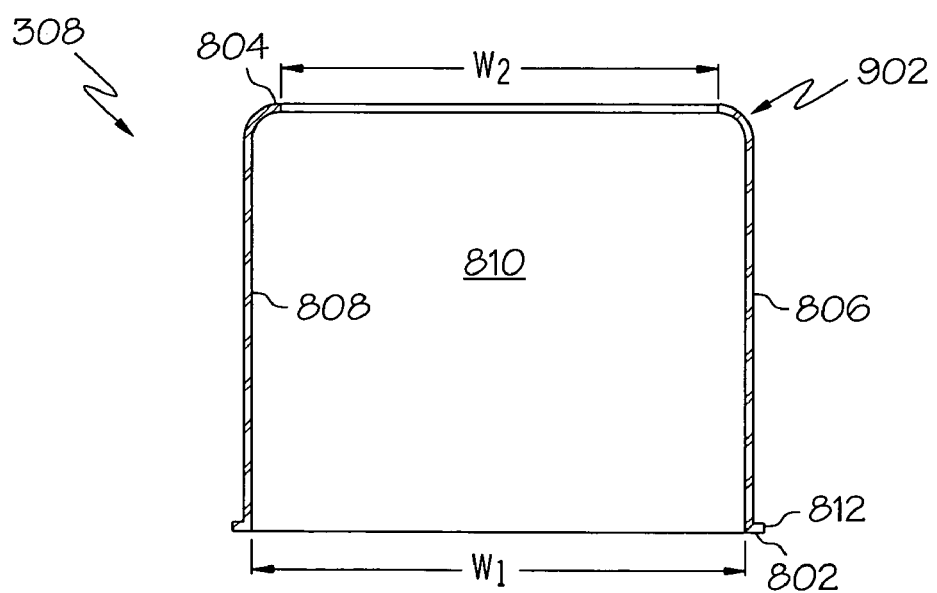
FIG. 9 is a cross section view of the exemplary inner shield shown in FIG. 8.

With continued reference to FIGS. 8 and 9, the inner shield 308 additionally includes a support flange 812. The support flange 812 extends substantially perpendicularly from the inner shield outer surface 806, and is disposed proximate the inner shield mount end 802. The support flange 812, as shown in FIG. 4, and as was alluded to above, supports the inner support ring 516 when the containment vessel 300 is assembled. Thus, some axial restraint, in addition to any axial restraint that may be provided by the lid assembly 310, is provided for the inner shield 308.

Returning FIG. 9, it is seen that the inner shield 308 is configured such that the width ($W_1$) of the cavity at the mount end 802 is greater than the width ($W_2$) of the cavity 810 at the insertion end 804. In the depicted embodiment, this is implemented by curving a section 902 of the inner shield 308 inwardly to form a curved lip. It will be appreciated that inner shield 308 may be configured in any one of numerous other ways to implement the lower width ($W_2$) of the cavity 810 at the insertion end 804. For example, the thickness of the inner shield 308 near the insertion end 804 could be varied. No matter how this lower width (or diameter in the case of a circular cavity) is implemented, it will be appreciated that this section 902 of the inner shield cavity 310 will, in the highly unlikely event of a flywheel failure, deflect most, if not all, of the energy of the ejected material before the material can impact the containment vessel lid assembly 310.

Figure 10:
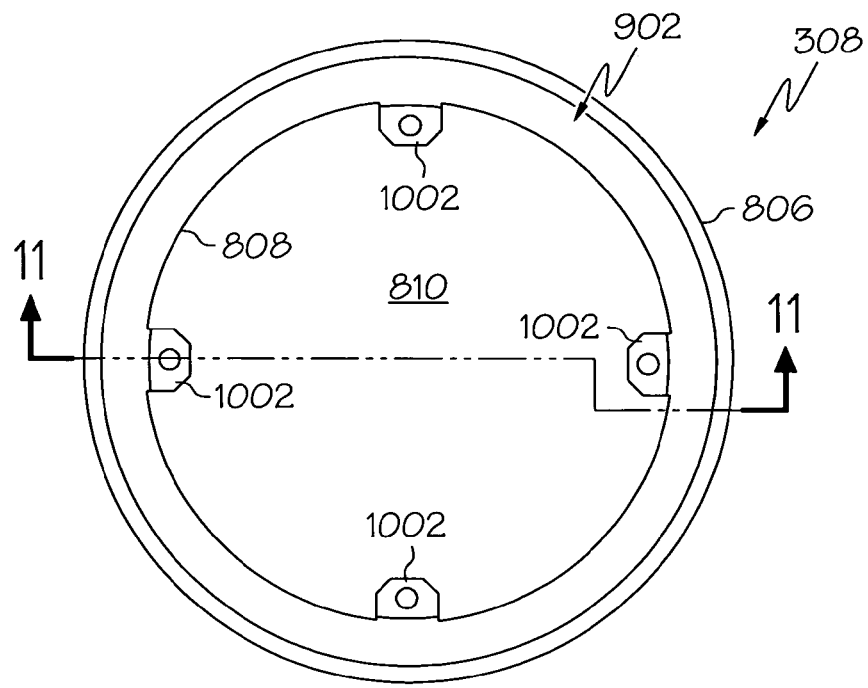
FIG. 10 is a top view of an alternative embodiment of the exemplary inner shield shown in FIGS. 8 and 9.
Figure 11:
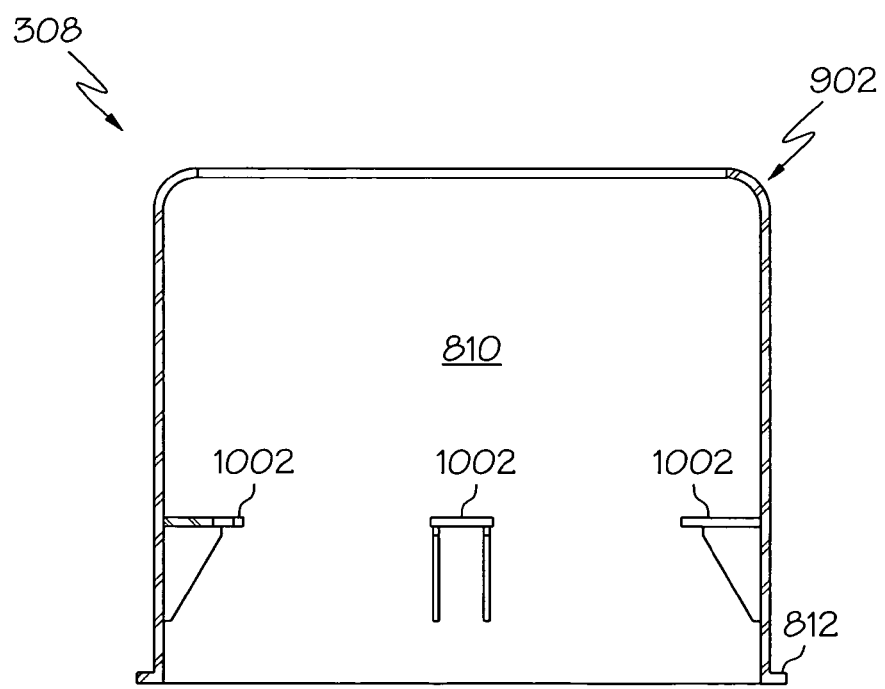
FIG. 11 is a cross section view of the alternative inner shield, taken along line 11—11 in FIG. 10.

The containment vessel 300, as has been repeatedly noted, is used to test energy storage flywheel systems 100, such as the one depicted in FIGS. 1 and 2, at up to full rotational speeds. Thus, the energy storage flywheel system 100 is mounted within the containment vessel 300, and more specifically, the inner shield 308, during the test. A separate mounting apparatus may be inserted into the inner shield 308 on which to mount the energy storage flywheel system 100, or the inner shield 308 may be configured with a mount structure. For example, as shown in FIGS. 10 and 11, the inner shield 308 may be configured to include a plurality of flywheel system mount flanges 1002. In the depicted embodiment, the inner shield 308 includes four flywheel mount flanges 1002 that are each disposed within the inner shield cavity 810 and extend from the inner surface 808.

The outer 302, intermediate 304, 306, and inner 308 shields may be made of any one of numerous types of materials, and in any one of numerous ways. In a preferred embodiment, the shields 302–308 are each made of medium carbon steel, such as ASTM A285 Grade C steel, which provides good energy absorption, via ductile deformation, and good momentum absorption, via its high inertia. The shields 302–308 are each preferably formed by welding two rolled plates together, though a single rolled plate could also be welded at its ends to form the shield 302–308. Moreover, the vessel mount flange 512 and lid mount flange 514 could be formed as integral parts of the outer shield 302, but in a preferred embodiment are separately formed and coupled to the outer shield outer surface 306 by, for example, a welding process.

The exemplary energy storage flywheel system containment vessel 300 described herein is configured to damp undesirable vibration during flywheel system testing. The vessel 300 is additionally configured to fully contain any high-speed fragments and/or plasma that may be generated during a highly unlikely structural failure during energy storage flywheel system testing.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An energy storage flywheel system containment assembly, comprising:
    an outer shield having a mount end, an insertion end, and an inner surface defining a cavity therein;
    an intermediate shield disposed within the outer shield cavity, and having a mount end, an insertion end, and an inner surface defining a cavity therein, the intermediate shield spaced apart from the outer shield to define an intermediate space therebetween; and
    an inner shield disposed within the intermediate shield cavity, and having a mount end, an insertion end, and an inner surface defining a cavity therein, the inner shield cavity having a first end that has a first width and a second end that has a second width that is less than the first width.

2. The containment assembly of claim 1, wherein the inner shield insertion end includes an opening that extends into the inner shield cavity.

3. The containment assembly of claim 2, wherein the inner shield mount end includes an opening that extends into the inner shield cavity.

4. The containment assembly of claim 1, wherein the inner shield cavity second end is substantially collocated with the inner shield insertion end.

5. The containment assembly of claim 1, wherein at least a portion of the inner shield extends inwardly into the inner shield cavity to form a momentum deflector rim, whereby the inner shield cavity second width is made less than the first width.

6. The containment assembly of claim 1, further comprising:

a lid adapted to be coupled to the outer shield insertion end, the lid configured to cover at least a portion of each of the outer shield, intermediate shield, and inner shield insertion ends.

7. The containment assembly of claim 6, wherein the lid is configured as a lid assembly that comprises:
    a containment vessel lid coupled to the outer shield insertion end, the containment vessel lid having an inner side facing at least the outer shield, an outer side, and an inner and outer peripheral side surfaces, the inner peripheral side surface defining an access opening through the containment vessel lid; and
    an access plate coupled to the containment vessel lid and covering at least the access opening, the access plate having an inner side, an outer side; and an outer peripheral side surface.

8. The containment assembly of claim 1, wherein:
    the outer shield mount end is configured to be coupled to a mount surface; and
    the outer shield insertion end includes an opening that extends into the outer shield cavity.

9. The containment assembly of claim 1, further comprising:
    a vibration damping material disposed within the intermediate space.

10. The containment assembly of claim 9, wherein the vibration damping material comprises sand.

11. The containment assembly of claim 1, wherein the intermediate shield comprises:
    an outer intermediate shield; and
    an inner intermediate shield disposed concentrically within the outer intermediate shield.

12. The containment assembly of claim 11, wherein:
    the outer intermediate shield is spaced apart from the outer shield to define a first intermediate space therebetween; and
    the inner intermediate shield is spaced apart from the outer intermediate shield to define a second intermediate space therebetween.

13. The containment assembly of claim 12, further comprising:
    a vibration damping material disposed within the first and second intermediate spaces.

14. The containment assembly of claim 13, wherein the vibration damping material comprises sand.

15. The containment assembly of claim 1, wherein the intermediate and inner shields are freely disposed within the outer shield.

16. The containment assembly of claim 1, further comprising:
    an inner support ring freely disposed within the outer shield cavity, the inner support ring having at least oppositely disposed first and second surfaces,
    wherein the intermediate shield mount end is disposed on the inner support ring first surface.

17. The containment assembly of claim 16, further comprising:
    a support flange coupled to the inner shield outer surface proximate the inner shield mount end, the support flange extending away from the inner shield outer surface and at least partially disposed adjacent the inner support ring second surface.

18. The containment assembly of claim 1, further comprising:
    a lid mount flange coupled to the outer shield outer surface proximate the outer shield insertion end and extending away from the outer shield outer surface; and a lid adapted to be coupled to the lid mount flange, the lid configured to cover at least a portion of each of the outer shield, intermediate shield, and inner shield insertion ends.

19. The containment assembly of claim 18, wherein the lid is configured as a lid assembly that comprises:
a containment vessel lid coupled to lid mount flange, the containment vessel lid having in inner side facing at least the outer shield, an outer side, and an inner and outer peripheral side surfaces, the inner peripheral side surface defining an access opening therethrough; and
an access plate coupled to the containment lid and covering at least the access opening, the access plate having an inner side, an outer side, and an outer peripheral side surface.

20. The containment assembly of claim 1, further comprising:
a vessel mount flange coupled to the outer shield outer surface proximate the outer shield mount end and extending away from the outer shield outer surface, the vessel mount flange adapted to couple the outer shield to a mount surface.

21. An energy storage flywheel system containment assembly, comprising:
an outer shield having a mount end, an insertion end, and an inner surface defining a cavity therein;
an intermediate shield freely disposed within the outer shield cavity, and having a mount end, an insertion end, and an inner surface defining a cavity therein, the intermediate shield spaced apart from the outer shield to define an intermediate space therebetween;
an inner shield freely disposed within the intermediate shield cavity, and having a mount end, an insertion end, and an inner surface defining a cavity therein, the inner shield cavity having a first end that has a first width and a second end that has a second width that is less than the first width;
a lid adapted to be coupled to the outer shield insertion end, the lid configured to cover at least a portion of each of the outer shield, intermediate shield, and inner shield insertion end,
wherein at least a portion of the inner shield extends inwardly into the inner shield cavity to form a momentum deflector rim, whereby the inner shield cavity second width is made less than the first width.

22. The containment assembly of claim 21, wherein the lid is configured as a lid assembly tat comprises:
a containment vessel lid coupled to outer shield insertion end, the containment vessel lid having in inner side facing at least the outer shield, an outer side, and an inner and outer peripheral side surfaces, the inner peripheral side surface defining an access opening through the containment vessel lid; and
an access plate coupled to the containment vessel lid and covering at least the access opening, the access plate having an inner side, an outer side, and an outer peripheral side surface.

23. The containment assembly of claim 21, wherein the intermediate shield comprises:
an outer intermediate shield; and
an inner intermediate shield disposed concentrically within the outer intermediate shield.

24. The containment assembly of claim 23, wherein:
the outer intermediate shield is spaced apart from the outer shield to define a first intermediate space therebetween; and
the inner intermediate shield is spaced apart from the outer intermediate shield to define a second intermediate space therebetween.

25. The containment assembly of claim 21, further comprising:
an inner support ring freely disposed within the outer shield cavity, the inner support ring having at least oppositely disposed first and second surfaces,
wherein the intermediate shield mount end is disposed on the inner support flange first surface.

26. The containment assembly of claim 25, further comprising:
a support flange coupled to the inner shield outer surface proximate the inner shield mount end, the support flange extending away from the inner shield outer surface and at least partially disposed adjacent the inner support ring second surface.

27. The containment assembly of claim 21, further comprising:
a lid mount flange coupled to the outer shield outer surface proximate the outer shield insertion end and extending away from the outer shield outer surface,
wherein the lid is coupled to the lid mount flange.

28. The containment assembly of claim 21, further comprising:
a vessel mount flange coupled to the outer shield outer surface proximate the outer shield mount end and extending away from the outer shield outer surface, the vessel mount flange adapted to couple the outer shield to a mount surface.

* * * * *

UNITED STATES PATENT AND TRADEMARK OFFICE
CERTIFICATE OF CORRECTION

| | | |
|---|---|---|
| PATENT NO. | : 7,111,522 B2 | Page 1 of 1 |
| APPLICATION NO. | : 10/788745 | |
| DATED | : September 26, 2006 | |
| INVENTOR(S) | : Wingett et al. | |

It is certified that error appears in the above-identified patent and that said Letters Patent is hereby corrected as shown below:

Column 10, line 15, "outer side; and" should be changed to --outer side, and--;
Column 11, line 8, "having in inner" should be changed to --having an inner--;
Column 11, line 41, "end," should be changed to --ends,--;
Column 11, line 47, "tat" should be changed to --that--.
Column 11, line 48, "coupled to outer" should be changed to --coupled to the outer--.

Signed and Sealed this

Eighth Day of May, 2007

JON W. DUDAS
*Director of the United States Patent and Trademark Office*